United States Patent [19]
Tolstov et al.

[11] 3,943,427
[45] Mar. 9, 1976

[54] APPARATUS FOR PROTECTING THE THYRISTORS OF A HIGH-VOLTAGE CONTROLLED CONVERTER FROM OVERVOLTAGE

[76] Inventors: Jury Georgievich Tolstov, Kutuzovsky prospekt, 2/1, kv. 214, Moscow; Vladimir Efremovich Skorovarov, ulitsa Tsiolkovskogo, 2, kv. 5, Dolgoprudny Moskovskoi oblasti; Boris Ilich Grinshtein, Nagatinskaya naberezhnaya, 64, kv. 80, Moscow; Valentina Gavrilovna Stepanova, 2 Kozhevnichesky pereulok, 3, kv. 4, Moscow; Ivan Pavlovich Bashkatov, ulitsa Lobachevskogo, 8, kv. 21, Moscow; Jury Danilovich Vinitsky, ulitsa Chertanovskaya, 39, korpus 2, kv. 56, Moscow; Valery Ottovich Balyasinsky, ulitsa 14 Parkovaya, 6, kv. 24, Moscow; Valery Pavlovich Zhmurov, ulitsa Vvedenskogo, 13, korpus 1, kv. 321, Moscow; Alexandr Venediktovich Natalkin, ulitsa Lavochkina, 8, kv. 13, Moscow; Grigory Bentsionovich Lazarev, pereulok Tashkentsky, 5, korpus 3, kv. 35, Moscow, all of U.S.S.R.

[22] Filed: July 11, 1974

[21] Appl. No.: 487,796

[52] U.S. Cl. ................................. 321/11; 317/61.5
[51] Int. Cl.² ............................................ H02M 1/18
[58] Field of Search ......... 307/252 L, 252 P, 252 Q; 317/49.5 D, 61.5; 321/11, 14, 27 R

[56] References Cited
UNITED STATES PATENTS

| | | |
|---|---|---|
| 3,309,575 | 3/1967 | Lee et al. ............................ 317/61.5 |
| 3,423,664 | 1/1969 | Dewey ................... 321/11 |
| 3,487,261 | 12/1969 | Boksjo et al. ........................ 321/11 |
| 3,551,739 | 12/1970 | Bossi ................................... 321/11 |
| 3,579,082 | 5/1971 | Bossi et al. ........................... 321/11 |
| 3,599,075 | 8/1971 | Etter et al. ........................... 321/11 |
| 3,662,250 | 5/1972 | Piccone et al. ...................... 321/11 |

FOREIGN PATENTS OR APPLICATIONS

| | | | |
|---|---|---|---|
| 454,265 | 6/1968 | Switzerland .................... 307/252 L |
| 269,283 | 7/1970 | U.S.S.R. ............................... 321/11 |

OTHER PUBLICATIONS
IEEE Transactions, Paper T 74050–1, presented at the IEEE PES Winter Meeting, New York, Jan. 27–Feb. 1, 1974.

*Primary Examiner*—William M. Shoop
*Attorney, Agent, or Firm*—Haseltine, Lake & Waters

[57] ABSTRACT

An apparatus for protecting the thyristors of a high-voltage controlled converter against overvoltage, said thyristors being connected to form a chain of successively connected thyristor modules, each of which comprises at least one thyristor. The protecting apparatus consists of an additional circuit comprising at least one link formed by two avalanche diodes connected in series opposition, said circuit being connected parallel to the chain of thyristor modules. The additional circuit serves to limit the magnitude of the voltage applied to the thyristor modules. The protecting apparatus further includes a surge arrester controlled by signals from a current sensor whose input is connected in said additional circuit. In accordance with signals from the current sensor, the controlled surge arrester limits the voltage across the additional circuit in case of overvoltage. The apparatus is intended for protecting a chain of thyristor modules of high-voltage controlled converters used, for instance, in rectifier and inverter substations of direct current transmission lines, against overvoltage.

4 Claims, 3 Drawing Figures

APPARATUS FOR PROTECTING THE THYRISTORS OF A HIGH-VOLTAGE CONTROLLED CONVERTER FROM OVERVOLTAGE

The present invention relates to the field of power semiconductor engineering, and more particularly to high-voltage semiconductor converters employed at the rectifying and inverting substations of d.c. power transmission lines.

Over the last decade considerable advances have been made in the development of power semiconductor valves (thyristors and diodes). The inherent advantages of thyristors over ionic tubes are well known. Thyristors are largely insensitive to environmental conditions and, hence, can operate in a far wider range of ambient temperatures; they require no special maintenance, have no propensity for arc-backs, feature minimized control power consumption requirements and are always ready to be energized. Semiconductor devices are highly transportable and capable of sustaining considerable mechanical load. The useful life of semiconductor instruments reaches 500,000 hours and even more.

These advantages of semiconductor instruments account for their wide use, above all in low- and medium-voltage devices.

Practice has borne out the excellence of power semiconductor devices.

What with the advancement of power semiconductor technology, engineers naturally started to look into the possibility of employing semiconductor devices in high-voltage converters for voltages on the order of scores and hundreds of kilovolts.

The main semiconductor device employed in high-voltage converters is a high-power controlled semiconductor rectifier or thyristor.

Since the available and future thyristors (meaning those that can be expected to appear in the forseeable future) have current and voltage ratings that are much lower than those required for a valve coupled into each arm of a converter bridge, thyristors can be used for such applications only in the form of strings of series-parallel-connected thyristors forming a unit.

However, it is not presently practical to mass produce high-power thyristors having precisely matching transient and steady-state characteristics, such as thyristor resistance, turn-on and turn-off times, etc., which creates certain difficulties as far as high-voltage application of thyristor strings is concerned. What with the difference in characteristics currents and voltages are unequally shared among individual thyristors, a feature which as often as not may be prohibitive for thyristor employment.

The low current and voltage overload capability of high-power thyristors also militates against the reliability of a semiconductor converter. Finally, the rates of rise of current and voltage may likewise prove to be critical parameters for thyristors.

Improving thyristor reliability by increasing the number of series-parallel thyristors in a semiconductor converter is not an ideal solution either, for it tends to increase the weight, size, cost and losses of the thyristor; moreover, such a measure sometimes falls short of the objective.

If a converter is to be reliable and exhibit excellent economic and engineering characteristics, it must be provided with thyristor protection devices arranged both to equalize and limit the values of current and voltage experienced by the thyristor.

Prior art devices include a voltage dividing R and R-C bypass network. Steady-state voltage sharing among thyristors in series is provided by paralleling each thyristor of a thyristor string with an identical resistor R.

To obtain this effect, however, resistance R must be less than that of the highest-leakage thyristor by at least one order of magnitude, which results in considerable additional losses.

Transient voltage sharing is obtained by shunting series-connected thyristors with additional R-C strings (see, for example, U.K. Pat. Nos. 1155749, 1160920, 1176923, 1205693; U.S. Pat. Nos. 3423664, 3508135; French Pat. No. 496049; Federal Republic of Germany Pat. Nos. 1095384, 1245501, 1263173; Swiss Pat. No. 397059; Swedish Pat. Nos. 217954, 227622, 309805, 321290, 322285; Japanese Pat. No. 9925 published in 1969).

The resistor R (in an R-C string) is needed to limit the capacitor discharge current through the thyristor at the instant it is turned on. The capacitance of the capacitor must considerably exceed the thyristor self-capacitance.

However, R-C strings do not protect thyristors from voltage overshoots, if the transition between blocking and conducting states of all thyristors in the string is not likely to occur simultaneously, because when the string is fired the voltage supply is shared by the series-coupled thyristors having the longest turn-on times, whereas when the string is turned off the voltage supply is shared by the thyristor sections having the least electric strength recovery times.

Therefore, R-C strings do not allow dispensing with the need to select thyristors having identical transition periods.

Nor do R-C strings protect thyristors against external overvoltages in the converter, for they do not limit voltage rise either in the thyristor string as a whole or across individual thyristors. In such a case the protective function is taken over by the converter surge arrestor. In view of the fact that the high-voltage surge arrestor trigger times and voltages widely fluctuate, thyristor strings must have a margin of voltage blocking capability, that is to say the number of series-coupled thyristors must be increased, with the resultant increase in the cost and size of the converter as well as in its losses.

Also known is a voltage-limiting device comprising series-coupled thyristors and additional strings of opposition-series-connected diodes with avalanche characteristics (see, for example, U.K. Pat. No. 1179605; French Pat. Nos. 1541367 and 1545137; Swiss Pat. No. 492334).

Those familiar with the art also know a semiconductor converter developed by AEG, Siemens and BBC companies (see "Brown Boveri Mitteilungen," 1969, 56 /2, "thyristors tromrichter fur 100 kv Bruckengleichspannung") where a string of thyristor modules comprising a pair of thyristors in parallel is protected by an additional string of opposition-series-coupled avalanche diodes. This converter was taken by the authors as a prototype.

In this converter the strings of avalanche diodes do not provide for voltage sharing among series-coupled thyristors, but only limit the non-uniformity of voltage distribution.

The opposition-coupled avalanche diodes, forming banks shunting the protected thyristors, limit the voltage across the thyristors to the value of the avalanche diode breakdown voltage chosen to be below the inflexion point on the thyristor current-voltage characteristic.

Since the avalanche diodes are connected in mutual series opposition, the voltage-limiting effect is obtained for voltages of both polarities.

The voltage across the thyristors is also limited by switching the three-phase converter bridge arms.

It should be noted that avalanche diodes employed instead of R-C strings reduce the probability of thyristor damage under the possible effect of their resistance fluctuation in operation.

Thus, avalanche diodes limit the value of voltage across the thyristors under conditions of normal steady-state operation with forward and reverse voltage impressed on the thyristor string, when the voltage is distributed among the string elements non-uniformly due to non-matching turned-off thyristor resistances; during the thyristor string turning-on process when, due to firing time spread, forward voltage is applied to the slow thyristors; during the thyristor string turning-off process when, due to thyristor turning-off time spread, reverse voltage is first impressed on the fastest (first-off) thyristors.

Nevertheless, voltage overshoot protection of the thyristors of said converter should be provided by surge arrestors, and the number of series-coupled thyristors must be chosen on the basis of the upper surge arrestor breakdown voltage, i.e., converter reliability is raised at the expense of its weight, size, cost and power losses.

It is an object of the present invention to provide means of overvoltage protection for the thyristors of a high-voltage controlled converter, which would ensure reliable operation of thyristors under conditions of overvoltage without increasing their number.

The invention is based on a new design of high-voltage converter thyristor overvoltage protection means which is sure to find wide application, particularly on high-voltage d.c. power transmission lines.

In carrying out the invention, there is provided means for overvoltage protection of the thyristors of a high-voltage controlled converter comprising at least two identical strings of thyristor modules, each of which is connected in parallel with an additional string including at least one bank of two opposition-series-coupled avalanche diodes; the surge arrestor of the invention is adapted to be controlled by the signals of a current overload sensor, with the latter's input connected in series relation with said additional string.

It is desirable that the control unit of said controlled surge arrestor be provided with a current-integration device the input of which will be coupled to the output of the current overload sensor.

It is also desirable to connect into the controlled surge arrestor circuit at least one uncontrolled surge arrestor in series therewith, with each two adjacent electrically connected electrodes of the controlled and uncontrolled surge arrestors coupled via a coupling resistance to two electrically connected anodes (cathodes) of the avalanche diodes of at least two adjacent banks of the additional string.

It is also desirable to connect at least one avalanche diode into the circuit of at least one thyristor module and one corresponding bank of the additional string.

The device according to the invention limits the overvoltage amplitudes across the string of series-coupled thyristor modules by the permissible voltage values and causes the controlled surge arrestor to operate in a selective manner in accordance with the overvoltage experienced by the system.

In the device of this invention the choice of the required number of thyristor modules is made on the basis of the operating voltage amplitude across the string of thyristor modules, rather than by the level of permissible overvoltages, which enables the number of modules to be minimized, with the consequent reduction of the cost, weight, size and power losses.

A device of this invention has been put to industrial tests and proved to be an effective means of overvoltage protection of high-voltage controlled converter thyristors on a 100-kV 150-A d.c. transmission line.

The device provided for reliable thyristor operation in a three-phase bridge converter under transient and emergency conditions at overvoltages amounting to a double or triple operating voltage amplitude.

The invention will be better understood from the following detailed description with reference to the accompanying drawings where, for the sake of clarity, use is made of concrete narrow terminology. Yet, the invention is not confined to the accepted narrow terms, and one should bear in mind that each term stands to cover all the equivalent elements operating on an analogous principle and employed to solve the same problems as are involved in the present invention.

Thus, for instance, the thyristor herein implies both the one-way and the double-way or fully controlled thyristor. The thyristor module stands to denote a single thyristor or several parallel-connected thyristors. The current overload sensor should be understood as a current transformer or any other kind of current overload sensors.

It should also be borne in mind that the various objects and advantages of the present invention will be more fully appreciated from the description and the drawings, wherein.

Figure 1:
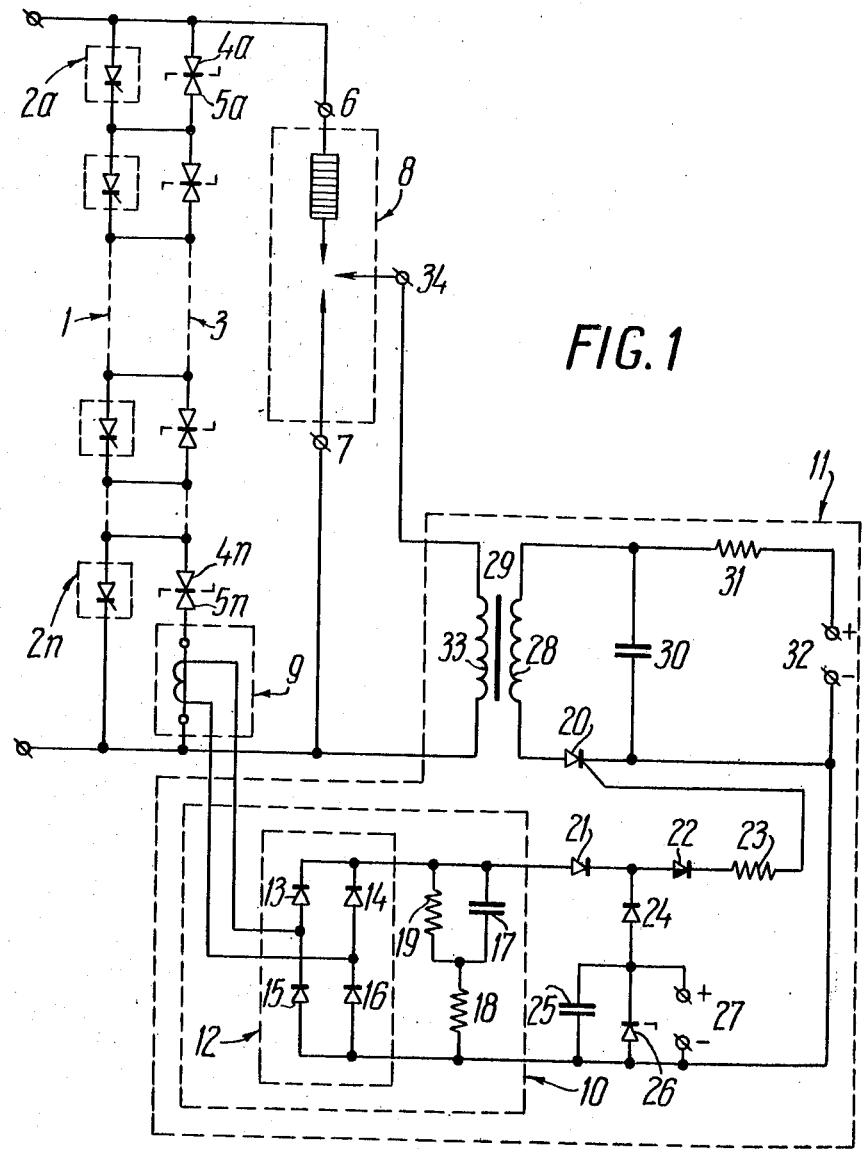
FIG. 1 is a schematic circuit diagram of a device of overvoltage protection of a string of thyristor modules of a high-voltage controlled converter, comprising, by way of example, one thyristor, and employing a controlled surge arrestor.

According to the invention, an apparatus for protecting the thyristors of a high-voltage converter from overvoltage is coupled into each arm of a three-phase converter and comprises a string 1 (FIG. 1) of series-coupled thyristor modules 2a–2n in shunt with an additional string 3 of banks each of which is defined by a pair of opposition-series avalanche diodes 4a–4n, 5a–5n. A controlled surge arrestor 8 is connected with its terminals 6, 7 in parallel to the strings 1, 3.

The input terminal of a current overload sensor 9 is connected in parallel to the string 3, the former being the primary winding of a current transformer, with the secondary winding thereof connected to the input of a current integrator 10 of a control unit 11 of the surge arrestor 8.

The current integrator 10 comprises a rectifier 12 built around diodes 13–16.

The output of the rectifier 12 through a resistor 18 is connected to a storage capacitor 17. The capacitor 17 is paralleled by a resistor 19.

The output terminal of the current integrator 10 is coupled to the control electrode of a thyristor 20 through a coupling diode 21, a dinistor 22 and a balast resistor 23 as well as to the cathode of the thyristor 20.

To the cathode of the diode 21 and the anode of the dinistor 22 is connected the cathode of a diode 24, and to its anode is connected a string comprising a capacitor 25 and of a Zener diode 26 in parallel relation, with the Zener diode anode and the free plate of the capacitor 25 connected to the cathode of the thyristor 20, whereas a d.c. voltage source 27 is coupled in parallel with the Zener diode 26.

The thyristor 20 is connected into a circuit including a primary winding 28 of a pulse transformer 29 and a capacitor 30, the latter connected through a resistance 31 to a d.c. voltage source 32.

A secondary winding 33 of the pulse transformer 29 is coupled to the main terminal 7 and an ignitor electrode 34 of the controlled surge arrestor 8.

Under normal conditions of converter operation the voltage across the string 1 does not exceed the total avalanche breakdown voltage of the in-phase avalanche diodes $4a$–$4n$ or $5a$–$5n$ (depending on the polarity of the voltage applied to the string) hence, all the in-phase diodes cannot operate simultaneously in an avalanche mode. The current flowing through the primary of the current transformer (current overload sensor 9) is an avalanche diode leakage current insufficient to energize the surge arrestor 8 of the control unit 11.

When overvoltages arise in the converter, the voltage across the thyristor string rises to the total avalanche breakdown voltage of the diodes $4a$–$4n$ or $5a$–$5n$, whereupon all the in-phase diodes commence operating in an avalanche mode, and the voltage across the string 1 stops rising. The circuit 3 of avalanche diodes starts conducting overload current with an amplitude and duration thereof depending on the electric parameters of the converter and the type of fault. This current may attain a value of scores and even hundreds of amperes.

The overvoltage protection means of this invention is capable of limiting voltage across the thyristor string 1 and across each of the thyristors $2a$–$2n$ subjected to overvoltage until the energy generated in the avalanche diodes $4a$–$4n$ or $5a$–$5n$ has surpassed a permissible value or until the current through the avalanche diodes has reached a breakdown value.

In this case the unit 11 generates a signal energizing the controlled surge arrestor 8 which fully or partially removes voltage from the thyristor string 1.

Since the avalanche diode breakdown voltage of the string 3 may be considered in the first approximation as invariable, the energy generated in the diodes operating in an avalanche mode is proportional to the integral of current flowing through the diodes, that is to say the amount of electricity through the string 3.

The energy generated in the string 3 is sporadically compared with the permissible value in the unit 11. For this purpose the control unit 11 is furnished with the built-in integrator 10 which sporadically integrates current in the string 3. Integration is carried out by the storage capacitor 17, charged through the bridge rectifier 12 comprising the diodes 13–16 with the current through the string 3 which is fed to the input of the current integrator 10 from the secondary winding of the current transformer (current overload sensor 9).

The voltage across the capacitor 17 is proportionate to the energy generated in the string 3. The dinistor 22 switching voltage is the voltage setting. As soon as the voltage across the capacitor 17 and resistor 18 attains the dinistor 22 switching voltage value, the dinistor 22 commences conduction and provides a circuit for the discharge of an auxiliary capacitor 25 precharged from a source 27. The circuits of the capacitors 17 and 25 are decoupled by diodes 21 and 24. The voltage across the capacitor 25 is stabilized by the Zener diode 26, this voltage being substantially lower than the switching voltage of the dinistor 22. The discharge of the capacitor 25 forms a pulse which through the coupling diode 22 and the limiting resistor 23 triggers the thyristor 20. As the thyristor 20 is triggered, the capacitor 30 precharged from the source 32 through the resistor 31 is discharged through the primary winding 28 of the step-up pulse transformer 29, the secondary winding 33 thereof being coupled to the ignitor electrode 34 and the main terminal 7 of the surge arrestor 8.

The control unit 11 is adjusted in such a way as to cause the dinistor 22 to switch either as a result of generation in the string 3 of the maximum allowable energy, or else if the value of current through the avalanche diodes of the string 3 exceeds, if only for a short time, a certain predetermined magnitude, which arrangement helps protect the avalanche diodes from electric breakdown due to excessive current.

The resistor 18 of the integrator 10 serves for adjustment for current cut-off operation, whereas the resistor 19 serves for sporadically discharging the capacitor 17.

In case the energy dissipated in the diodes of the string 3 does not exceed an allowable value and the value of current does not exceed the cut-off setting, the discharger 8 will not be rendered operative. Then the protective function of the device will be just to limit the overvoltage across the thyristor string 1 to the permissible value of the total breakdown voltage of the avalanche diodes of the string 3. Overvoltages of this variety include practically all overvoltages caused by failures in the converter proper.

However, overvoltages resulting from emergency voltage overshoots on power transmission lines (for example, in cases when a rectifier operates into a non-conducting inverter) or from excessive voltages in a.c. systems (for example, when high-power transformers are switched to a no-load condition) may be beyond the overvoltage-suppression capability of this device, for the energy-dissipation duty imposed on the diode string 3 could exceed its rating.

Then the control unit 11 gives off a signal triggering the surge arrestor 8. The controlled surge arrestor operation in such a case should be regarded as correct functioning of the protection device.

In designing protecting apparatus, high demands must be placed on the reliability of the thyristors of the module $2n$ which is essential for actuating the current sensor 9. The thyristors of the module $2n$ must be switched on, reliably and without delay, by control pulses. Failure or delay in the operation of the thyristors $2n$ would allow current of the power circuit to flow through the sensor 9, which may result in a false signal being generated to actuate the surge arrestor 8.

Further measures are to be taken to prevent the switching over of the anodes of the thyristors 2n under the effect of surges of the forward voltage. If the anodes of the thyristors 2n are actuated by overvoltage in the converter, the current sensor 9 is shunted, which is likely to cause failure of the protecting apparatus.

The protecting apparatus is also likely to fail upon the breakdown of the thyristors 2n. To enhance the reliability of the protecting apparatus, it is expedient to provide at least one additional set of a current sensor 9 and a control unit 11, for instance, in an adjacent thyristor cell 2n-1.

The device described above (FIG. 1) is recommended for converters having an output voltage of the order of 100 kV, the voltage of both polarities applied to the thyristor strings having the same amplitude.

Figure 2:
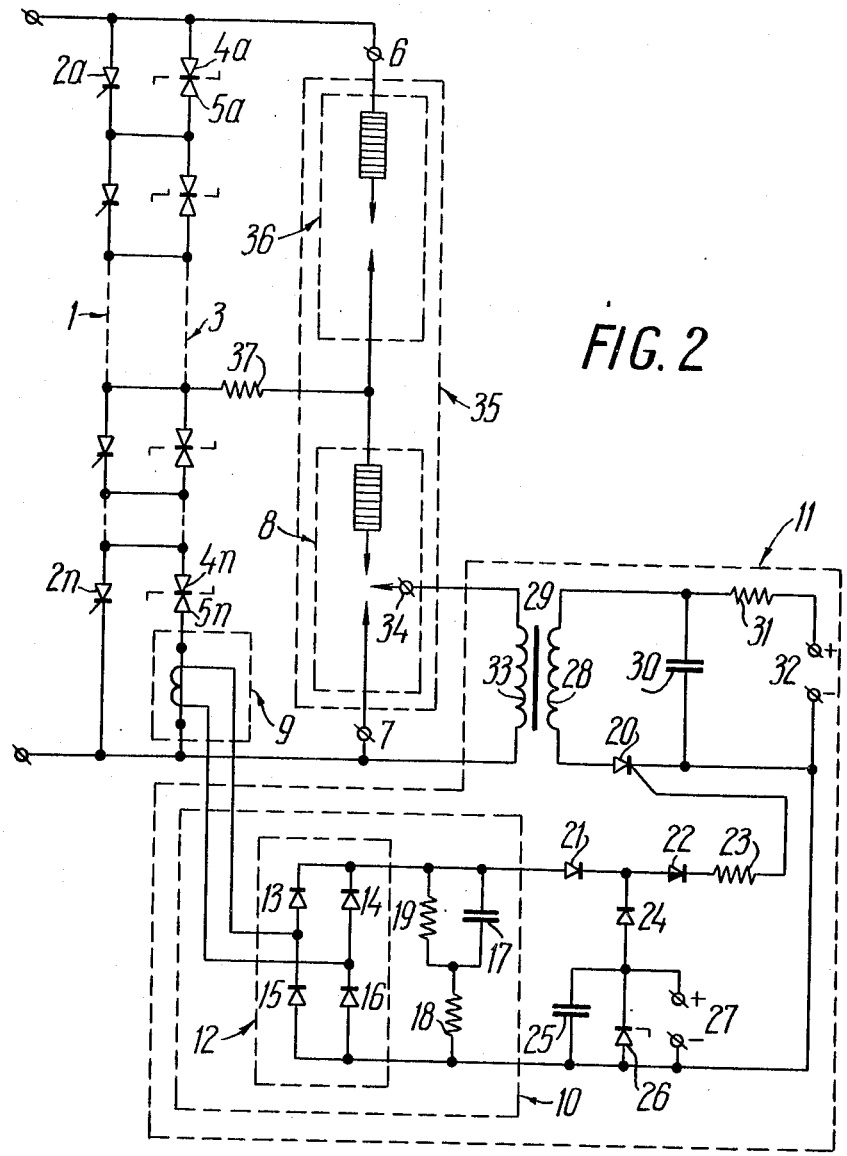
FIG. 2 is a schematic circuit diagram of the overvoltage protection device shown in FIG. 1 comprising a multi-electrode controlled surge arrestor.

Converters having an output voltage in excess of 100 kV should preferably be provided with an overvoltage-suppression device having a multi-electrode controlled surge arrestor 35 (FIG. 2) comprising the controlled surge arrestor 8, with one or several uncontrolled surge arrestors 36 (FIG. 2 shows one uncontrolled surge arrestor) connected in series therewith depending on the converter voltage rating. Each pair of adjacent electrically coupled electrodes of the surge arrestors 8 and 36 are coupled, through a coupling resistor 37, to two electrically coupled anodes (cathodes) of the avalanche diodes of at least two adjacent banks of the string 3.

The breakdown voltage of the in-phase avalanche diodes shunting the discharge spacing must be smaller than the breakdown voltage of this spacing if the surge arrestor 8 is not fired.

The maximum voltage across the discharge spacings is rigorously maintained at a constant value which is attained by parallel connection of avalanche diode banks. This feature improves the multiplicity factor of the surge arrestor voltage operation. The sequential breakdown of the interelectrode discharge spacings of the surge arrestor following ignitor breakdown reduces the time of operation and improves reliability.

Figure 3:
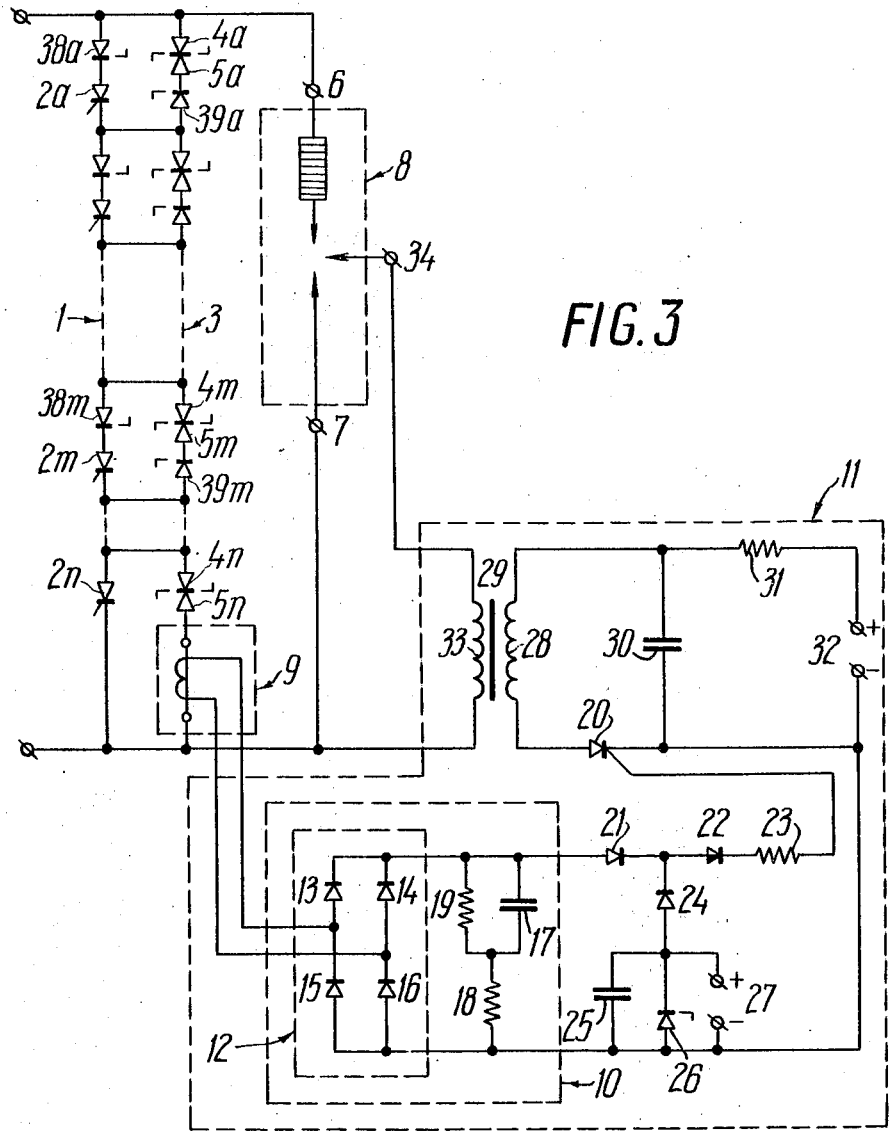
FIG. 3 is a schematic circuit diagram of the overvoltage protection device of FIG. 1 comprising additional opposition-series avalanche diodes in thyristor modules and string banks.

For converters where the reverse voltage amplitude across thyristor strings exceeds the forward voltage amplitude (as, for example, in single-bridge low-power converters) the strings 1,3 of thyristors and protective avalanche diodes should be preferably arranged to include, respectively, additional avalanche diodes 38a–38m and 39a–39m (FIG. 3).

This arrangement conduces to a reduced number of series thyristor modules in a string. The number of thyristor modules having additional avalanche diodes depends on the forward and reverse voltage amplitude ratio at the input of the strings.

What is claimed is:

1. An apparatus for protecting the thyristors of a high-voltage controlled converter against overvoltage, the thyristors forming a string of successively connected thyristor modules each of which includes at least one power thyristor, for instance, for use in direct current power transmission lines, comprising:
   at least one additional string comprising at least one bank formed by two avalanche diodes connected in series opposition and connected parallel to the string of thyristor modules;
   said additional string limiting the value of voltage applied to the thyristor modules; and
   at least one surge arrestor adapted to be controlled by the signals from a current sensor, with the input thereof connected in the circuit of said additional string;
   said controlled surge arrester limiting, in accordance with signals from the current sensor, the value of voltage across the additional string in case of overvoltage.

2. Means for protecting the thyristors of a high-voltage controlled converter from overvoltage, as of claim 1, comprising:
   a control unit of said controlled surge arrestor furnished with a current integrator, with a current overload sensor coupled to the input thereof;
   said unit, integrating the magnitude of current in the additional string and giving off signals causing a breakdown of the spacing between the additional and working electrodes of the controlled surge arrestor with the resultant breakdown of the discharge spacing between the working electrodes thereof which leads to a voltage drop across the additional string.

3. An apparatus for protecting the thyristors of a high-voltage controlled converter from overvoltage, as of claim 2, wherein:
   at least one uncontrolled surge arrestor is coupled into the controlled surge arrestor circuit in series therewith;
   said uncontrolled surge arrestor increasing the surge arrestor breakdown voltage;
   a coupling resistor coupled to two electrically connected anodes (cathodes) of the avalanche diodes of at least two adjacent banks of the additional string, and to two adjacent electrically connected electrodes of the controlled and uncontrolled surge arrestors;
   said resistor arranged to divide voltage among the individual surge arrestors with the help of the additional string.

4. An apparatus for protecting the thyristors of a high-voltage controlled converter from overvoltage, as of claim 2, wherein:
   at least one avalanche diode is coupled into the circuit of at least one thyristor module of the thyristor string and one corresponding bank of the additional string;
   said avalanche diode arranged to reduce the required number of thyristor modules in a string in case the reverse voltage amplitude across the thyristor strings exceeds the forward voltage amplitude.

* * * * *